(12) United States Patent
Olson

(10) Patent No.: US 9,992,058 B2
(45) Date of Patent: Jun. 5, 2018

(54) REDUNDANT STORAGE SOLUTION

(71) Applicant: SOFTNAS OPERATING INC., Houston, TX (US)

(72) Inventor: Eric Olson, Melbourne, FL (US)

(73) Assignee: SoftNAS Operating Inc., Houston, TX (US)

( * ) Notice: Subject to any disclaimer, the term of this patent is extended or adjusted under 35 U.S.C. 154(b) by 0 days. days.

(21) Appl. No.: 15/817,047

(22) Filed: Nov. 17, 2017

(65) Prior Publication Data

US 2018/0077007 A1 Mar. 15, 2018

Related U.S. Application Data

(63) Continuation-in-part of application No. 15/435,195, filed on Feb. 16, 2017, which is a continuation of (Continued)

(51) Int. Cl.

| G06F 11/00 | (2006.01) |
|---|---|
| H04L 12/24 | (2006.01) |
| H04L 29/14 | (2006.01) |
| H04L 29/08 | (2006.01) |
| H04L 12/741 | (2013.01) |
| G06F 11/20 | (2006.01) |
| H04L 12/26 | (2006.01) |

(52) U.S. Cl.
CPC ...... *H04L 41/0668* (2013.01); *G06F 11/2007* (2013.01); *G06F 11/2023* (2013.01); *G06F 11/2033* (2013.01); *G06F 11/2092* (2013.01); *G06F 11/2094* (2013.01); *H04L 41/0816* (2013.01); *H04L 45/745* (2013.01); *H04L 67/1097* (2013.01); *H04L 69/40* (2013.01); *H04L 43/10* (2013.01)

(58) Field of Classification Search
CPC ............. G06F 11/2092; G06F 11/2007; G06F 11/2033; G06F 11/2094
See application file for complete search history.

(56) References Cited

U.S. PATENT DOCUMENTS

| 8,108,715 B1 * | 1/2012 | Agarwal ............. G06F 11/0709 714/10 |
|---|---|---|
| 8,495,323 B1 * | 7/2013 | Tatavarty ............ G06F 9/45558 711/164 |

(Continued)

*Primary Examiner* — Charles Ehne
(74) *Attorney, Agent, or Firm* — Polsinelli PC

(57) ABSTRACT

Method and apparatus for switching between a first server and a second server, each located within a virtual private cloud and the first server being located within a first zone and the second server being located within a second zone that is physically separate from the first zone. The method and apparatus further configured to determine that the first server has experienced a failure to send or receive data. The method and apparatus further configured to enable a second port on the second server. The method and apparatus further configured to create a new route table by the second server and flush the previous route table. The method and apparatus further configured to transmit, via the second port, a request to a virtual private cloud controller to update an elastic internet protocol address with the second port information and receive data from the virtual private cloud controller.

20 Claims, 7 Drawing Sheets

Related U.S. Application Data application No. 14/538,579, filed on Nov. 11, 2014, now Pat. No. 9,584,363.

(60) Provisional application No. 61/902,776, filed on Nov. 11, 2013.

(56) References Cited

U.S. PATENT DOCUMENTS

| | | |
|---|---|---|
| 9,098,392 B1* | 8/2015 | Gadiraju ............ G06F 11/2023 |
| 9,124,534 B1* | 9/2015 | Bhalerao ............ H04L 41/0893 |
| 2013/0064102 A1* | 3/2013 | Chang .................... H04L 49/70 370/244 |
| 2013/0246666 A1* | 9/2013 | Vemuri ................ G06F 3/0622 710/15 |
| 2013/0254599 A1* | 9/2013 | Katkar ................ H04L 43/0811 714/57 |

\* cited by examiner

REDUNDANT STORAGE SOLUTION

CROSS-REFERENCE TO RELATED APPLICATION

This application is a continuation-in-part of U.S. patent application Ser. No. 15/435,195, filed Feb. 2, 2017, which is a continuation of U.S. Pat. No. 9,584,363, filed Nov. 11, 2014, which claims priority to U.S. Provisional Application No. 61/902,776, filed Nov. 11, 2013, the entirety of each is hereby incorporated by reference herein.

FIELD

The subject matter herein generally relates to providing redundant storage solutions.

BACKGROUND

Typically, accessing cloud environments requires a user to connected to a server (or controller) through an elastic internet protocol (IP) address. Elastic IP addresses are publically accessible (e.g., accessible via the Internet). In redundant storage environments (e.g., source and target), the elastic IP address is assigned to the source server, while the target or backup server is not publically accessible. During a failure on at the source server, the elastic IP address is assigned to the target server. In order for this to happen, the traffic has to go outside the network and back into the network (e.g., through the Internet) creating a security risk.

BRIEF DESCRIPTION OF THE DRAWINGS

Implementations of the present technology will now be described, by way of example only, with reference to the attached figures, wherein.

DETAILED DESCRIPTION

Figure 1:
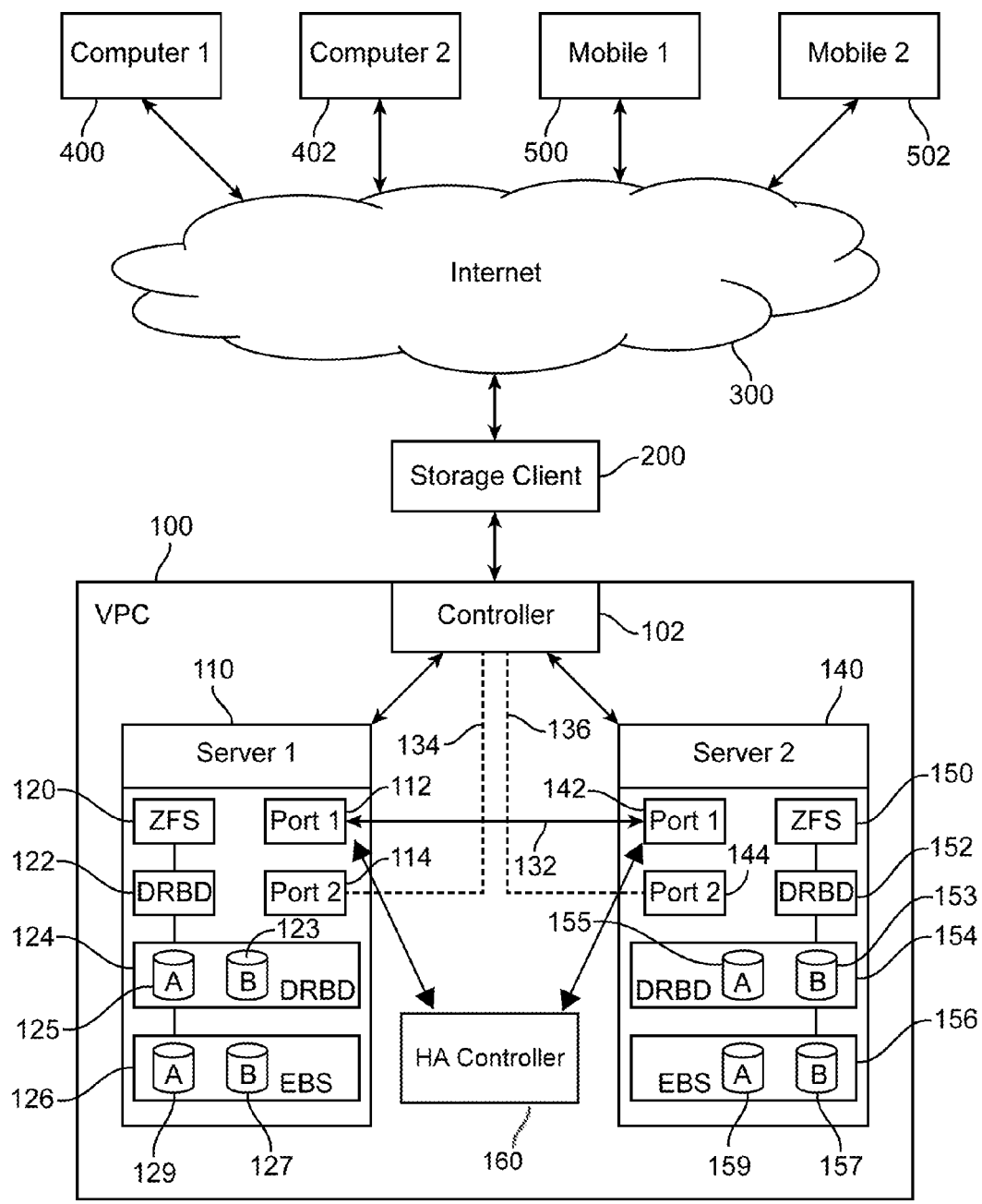
FIG. 1 is an example of a possible system architecture implementing the currently disclosed subject matter.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term coupled is defined as directly or indirectly connected to one or more components. The term server can include a hardware server, a virtual machine, and a software server. The term node can be used interchangeably with the term server.

The present technology is configured to comprise two or more servers located within a Virtual Private Cloud (VPC). Two of the two or more servers are located within different zones within the VPC. For example, the VPC can be defined within a particular area, but the two or more servers are located some distance apart. In at least one embodiment, there are two or more servers each having a corresponding zone. In at least one implementation, the zone is an availability zone. In other embodiment, the two or more servers can be located within the same zone. The present technology comprises at least two or more servers that are configured such that one of the servers is a primary server and the other servers are backups or redundant servers, such that all of the data that is present on the first server is also present on the backups or redundant servers. For example, the backups or redundant servers can be mirror storage devices of the primary server.

The present technology can be configured to provide a virtual IP address to replace a publically accessible elastic IP address for accessing data stored on the primary server (e.g., to alleviate the security risk). In some embodiments, the virtual IP address is not publically routable. In the embodiments where the virtual IP address is configured, connection to the cloud environment (via the virtual IP) can be via a virtual machine server within the same virtual private cloud where the servers are connected. In some embodiments, the virtual IP address cannot be in the same network as the cloud environment to which the two or more servers are operating. For example, when the cloud environment is operating in the 10.X.X.X network, the virtual IP address can operate in any network other than the 10.X.X.X network. In some embodiments, instead of floating the elastic IP address across nodes via the elastic network interfaces, the virtual IP address can be assigned to a subinterface (e.g., on Ethernet 0). In order to route to the virtual IP address, an static route can be added to the route table (e.g., in private or public cloud environments). During a failure, the virtual IP address can be configured to point to the target node (via an updated route table at the private or public cloud environment).

The present technology is configured to provide a seamless failover in the event that the first server is not able to send and/or receive data, with a client device; the communication from the client device is routed over to a second server. In at least one implementation, the switch over to the second server is such that it can be made such that there is no disruption of communication from the client to data stored on the two or more servers.

In at least one embodiment, the present technology can be implemented as a software or a hardware module. In at least one embodiment, the present technology causes a processor to execute instructions. The software module can be stored within a memory device or a drive. The present technology can be implemented with a variety of different drive configurations including Network File System (NFS), internet Small Computer System Interface (iSCSi), and Common Internet File System (CIFS). Additionally, the present technology can be configured to run on VMware ESXi (which is an operating system-independent hypervisor based on the VMkernel operating system interfacing with agents that run on top of it). Additionally, the present technology can be configured to run on Amazon® Web Service and Microsoft Azure®.

In at least one embodiment, the present technology is configured to provide for a system and method of switching between a first node and a second node (or third node), each located within a virtual private cloud, where the first node is located within a first zone and the second node is located within a second zone (or a third node located within the second zone or a third zone) that is separate from the first zone, the nodes each comprising pools and volumes. In at least one embodiment, the method comprises determining at the second node that the first node has experienced a failure to send or receive data, enabling a second port on the second node, creating a new route table by the second node, flushing the previous route table, transmitting via the second port a request to a virtual private cloud controller to update an internet protocol address with the second port information, and receiving via the second port data from the virtual private cloud controller. In at least one embodiment, subsequent failure of the first node, the third node can become a backup to the second node and the new route table can be configured as such. In one embodiment, the request to a virtual private cloud controller to update an internet protocol address with the second port information utilizes a load balancer. In one embodiment, the second zone is physically separate from the first zone. In another embodiment, the second zone is logically separate from the first zone. In some embodiments, determining that the first node has experienced the failure to send or receive data is performed at a high availability (HA) controller independent of the second server.

In at least one embodiment, the controller can be an HA controller. For example, the HA controller can determine when to initiate an automatic failure based on observed issues with the network or server (e.g., network latency, storage responsiveness, connectivity, etc.). The HA controller can make API calls to the virtual private cloud controller to initiate network re-routing from the first server to the second server during observed issues.

In at least one embodiment, the controller can be a third party witness. For example, the third party witness can be a trusted shared value to indicate the designated roles of the nodes (e.g., primary or target). In some examples, the third party witness can be queried when a node comes online (e.g., from an offline state). For example, when the primary node has an issue and goes offline, the target node will take over the primary role and the third party witness will be updated. When the first node comes back online, it can query the third party witness to determine its role. In the above example, the first node is now a target node and can configure itself accordingly, for example, send a notification and/or heartbeat to the second node (e.g., primary) for replication and reconciliation of data.

In at least one embodiment, the target node (e.g., second server) a can have three functions, storage functions, takeover functions and third party witness functions. The target node can maintain replicated copies of data stored on the source node that can be used (by outside devices) during a failover event. The target node can also maintain the high availability controller for: (i) monitoring the primary node for failures, (ii) initiating and managing takeover events (including communication with the virtual private cloud controller) during an issue with the primary node; and (iii) isolating the failed node so it cannot interfere with the new primary node (e.g., target node) after a takeover. The target node can also act as the third party witness, by storing the trusted values (e.g., roles of the nodes). For example, in event of a single, or dual failure, the third party witness ensures the nodes now their respective roles to void a multiple primary or multiple target situation. The third party witness can be updated during any change in role of the nodes.

In some examples, the HA controller and third party witness can run on the third node, e.g., independent of the storage nodes (e.g., primary node and target node). In some examples, the third party witness can be stored on an object in the cloud. In some examples, the third party witness can be running on a low processor virtual server.

In some examples the third party witness is a timestamp representing a last takeover time of the first node. In some examples, a timestamp of the third party witness is compared at the second node to verify status as the primary node by determining the timestamp of the third party witness matches a locally stored timestamp on the second node. In some examples, a value of the third party witness is stored within a shared object or file accessible by the first node and the second node.

In at least one embodiment, the systems and methods further comprise automatically discovering the information present on both nodes necessary to achieve replication, including at least determining which storage pools and volumes need to be replicated. In some embodiments, the determination may further include automatically discovering storage pools on the nodes that have the same name, automatically discovering the volumes in each such storage pool, automatically configuring tasks necessary for each volume to be replicated, automatically determining whether a full back-up or synchronization from the first node to the second node of all storage pools and volumes in the source node is necessary, and upon such determination, executing the full back-up or synchronization from the first node to the second node of all storage pools and volumes in the source node.

In at least one embodiment, the systems and methods further comprise automatically discovering and configuring source and target nodes. In some embodiments, a user can designate a source node and a target node, and in response to the designation the nodes can be automatically configured to operate as source and target nodes. For example, a user can autodiscovery one or more nodes in a cloud, via a graphical user interface, and select a source node and target node from the one or more autodiscovered nodes. In some examples, the autodiscovery can involving Application Programming Interfaces (APIs) or agent running on the servers or in the cloud environment. In other examples, a user can designate a source node or target node by enter identifying information of the source node and target node (e.g., IP address, hostname, etc.).

In some embodiments, the systems and methods can automatically discover the networking configurations of the source nodes and target nodes. For example, a high availability (HA) controller can automatically determine the cloud platform where the source nodes and target nodes reside (e.g., Microsoft Azure, Amazon Web Services, etc.). In some examples, the controller (e.g., cloud controller) can utilize APIs to automatically discover network information of the source and target nodes, for example, the IP address, subnets, cloud ID, virtual private cloud ID, route table ID, default gateway, network adapter ID, etc.

In at least one embodiment, the system and methods comprise one or more pre-requisite checks before autodiscovery and autoconfiguration of the nodes. For example, the pre-requisites can include, but are not limited to: validation of the network interfaces of the nodes, security policies and groups of the nodes, HA permissions, etc.

In at least one embodiment, the method further comprises performing a snap replication once per a first predetermined period, the snap replication comprising synchronizing data on the first node to the second node which has changed within a second predetermined period. In at least one embodiment, the method further comprises providing access to the first node or the second node via a user-interface. In one embodiment, the user-interface is an application programming interface. In another embodiment, the user-interface is a complete packet inspection interface.

In at least one embodiment, the method further comprises authorizing two-way communication between the nodes via at least one secure shell. In at least one embodiment, the method further comprises authorizing two-way communication between the nodes via at least one secure network connection. In one embodiment, the secure network connection is via TCP/IP. In another embodiment, the secure network connection is via secure shell.

In at least one embodiment, the present technology is configured to provide for a method of switching between a first node and a second node, each located within a virtual private cloud, where the first node is located within a first zone and the second node is located within a second zone that is physically separate from the first zone, the nodes each comprising pools and volumes. In at least one embodiment, the method comprises determining at the second node that the first node has experienced a failure to send or receive data, enabling a second port on the second node, creating a new route table by the second node, flushing the previous route table, transmitting via the second port a request to a virtual private cloud controller to update a load balancer with the second port information, and receiving via the second port data from the virtual private cloud controller.

In at least one embodiment, the present technology is configured to provide for a virtual private cloud configured to be connected to the internet via a hypertext transfer protocol server, the virtual private cloud comprising a first server comprising a first network interface card and a second network interface card and a second server comprising a first network interface card and a second network interface card. In one embodiment, the second server is configured to be communicatively coupled to the first server to provide for a redundant file system and the first network interface card on the first server is configured to be coupled to the first network interface card on the second server. In at least one embodiment, the second server is configured to determine that the first server has experienced a failure to send or receive data, enable a second port on the second server, create a new route table by the second server, flush the previous route table, transmit via the second port a request to a virtual private cloud controller to update an elastic internet protocol address with the second port information, and rescue via the second port, data from the virtual private cloud controller.

The present technology is configured to provide for seamless cross-zone failover. As illustrated in FIG. 1, an example of the present disclosure is illustrated. A VPC 100 is illustrated. The VPC 100 comprises a controller 102. The controller 102 can control the first server 110 and the second server 140. While only two servers are illustrated in the present example, the technology can be implemented with two or more servers. The illustration of only two servers is provided to simplify the presentation of information. The controller can be communicatively coupled to a storage client 200. The storage client 200 can be a web server, for example a hypertext transfer protocol (HTTP) server. In other embodiments, other types of storage clients can be implemented. In other embodiments, the storage client 200 can be configured to allow for pass through of data and not necessary provide for storage. The storage client or other device can be communicatively coupled to the internet 300.

Additionally, as illustrated, there are several client devices that connect to the storage client 200 through internet. The client devices can include a first computer 400 and a second computer 402. The client devices can further include a first mobile device 500 and a second mobile device 502. Other devices that need access to storage client 200 are also considered within this disclosure. The other devices can include tablets, laptops, servers, navigation devices, electronic systems within an automobile, and other special purpose devices.

The first server 110 can comprise a first communication port 112 and a second communication port 114. The first communication port 112 and the second communication port 114 can be any interface that is designed to communication with a corresponding communication interface on another device that allows for communication between the devices. In one example, the first communication port 112 and the second communication port 114 can be network interface cards (NICs). In other configurations the first communication port 112 and the second communication port 114 can be other devices that allow for transfer of data including universal serial bus, Ethernet, optical data cards, and the like. While the first communication port 112 and the second communication port 114 can be the same type of port, in other implementations, the ports 112, 114 can be different.

The second server 140 can comprise a first communication port 142 and a second communication port 144. The first communication port 142 and the second communication port 144 can be any interface that is designed to communication with a corresponding communication interface on another device that allows for communication between the devices. In one example, the first communication port 142 and the second communication port 144 can be network interface cards (NICs). In other configurations the first communication port 142 and the second communication port 144 can be other devices that allow for transfer of data including universal serial bus, Ethernet, optical data cards, and the like. While the first communication port 142 and the second communication port 144 can be the same type of port, in other implementations, the ports 142, 144 can be different.

As illustrated the first communication port 112 of the first server 110 can be configured to be communicatively coupled with the first communication port 142 of the second server 140. The communicative coupling of the first server 110 with the second server 140 allows for data to be transferred between the first server 110 and the second server 140. This allows for the data on the second server 140 to be a mirror of the data on the first server 110, thereby providing a backup to the data on the first server 110.

The controller 102 can be configured to direct data traffic to the first server 110 or the second server 140 based upon an elastic internet protocol address (EIP).

The first server 110 can further include a zone file system (ZFS) 120. ZFS can be used to send and receive data for asynchronous replication. ZFS can be configured to communicate with a distributed replicated block device (DRBD) 122 on the first server 110. The DRBD 122 can be configured to communicate with DRBD devices 124 such as a first disk device A 125 and a second disk device B 123. Additionally, the server can comprise an elastic block storage (EBS) 126. The EBS 126 can comprise a first volume A 129 and a second volume B 127. The EBS first volume A 129 can be communicatively coupled to the first disk device A 125. The EBS second volume B 127 can be communicatively coupled to the second disk device B 123.

The second server 140 can further include ZFS 150. The ZFS can be configured to communicate with a DRBD 152 on the first server 110. The DRBD 152 can be configured to communicate with DRBD devices 154 such as a first disk device A 155 and a second disk device B 153. Additionally, the server can comprise an EBS 156. The EBS 156 can comprise a first volume A 159 and a second volume B 157. The EBS first volume A 159 can be communicatively coupled to the first disk device A 155. The EBS second volume B 157 can be communicatively coupled to the second disk device B 153.

In normal operation, the first server 110 is communicatively coupled to the controller 102 via a second port 114 over communication channel 134. Additionally, data that is being accessed at the first server is stored on the first disk device A 125 and the first volume 129. This data is replicated to the second server 140 via the first ports 112, 142 over communication channel 132. The replicated data is stored on the second server 140 in the first disk device A 155 and first volume A 159. The data stored on the second disk device B 123 and the second volume 127 is the backup or replication of the data on second server 140 on second disk device B 153 and the second volume 159.

When the second server 140 detects that the first server 110 has lost communication, the second server enables the second port 144 to communicate with the controller 102 via communication channel 136. The second server 140 sends information to the controller 102 to update the EIP so that communication can flow to the second server 140 instead of the first server 110. As described below, the transformation of the EIP can be as a result of the second server 140 creating a new route table and flushing the old route table. Once the EIP is updated, the data that was originally being directed towards the first server 110 is directed to the first disk device 155 and the first volume 159, so that the client devices do not experience any delay in accessing or storing data and the data set remains complete.

While the above has used volumes and disk devices to describe the EBS and DRBD devices, these terms can refer to one or more files or one or more devices. Additionally, the controller 102 has been described within the VPC 100; however the controller 102 can be located outside of the VPC. While the above has been described in relation to servers, other types of structures are considered within this disclosure.

VPC 100 can also include an HA Controller 160. In this instance, HA Controller 160 is a virtual machine which can connect to the one or more servers (e.g., 110, 140, etc.), for example, through one or more ports (e.g., 112, 114, 142, 144, etc.). In other instances, HA Controller can be a flat file stored in a volume on the one or more servers. For example, in Amazon® Web Service the HA Controller can be stored in an S3 bucket and in Microsoft Azure® the HA Controller can be stored in an Azure blob.

Figure 2A:
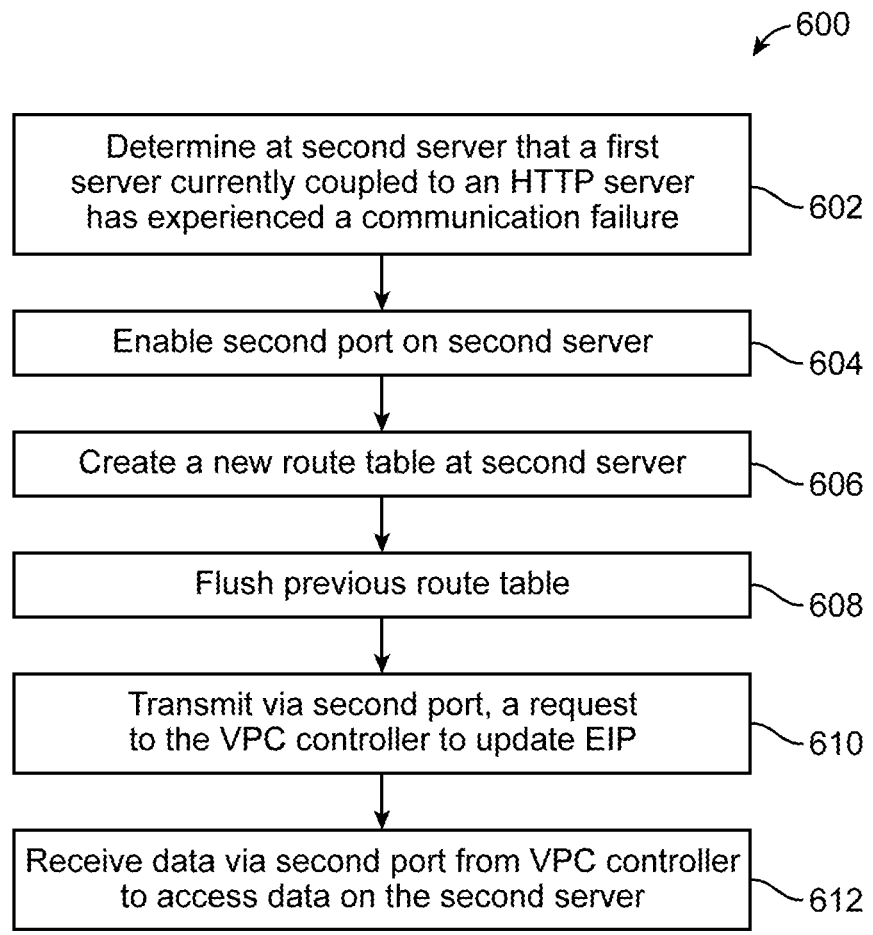
FIGS. 2A, 2B and 2C are example methods according to the present disclosure.

The present disclosure also includes a method 600 as illustrated with respect to FIG. 2A. As illustrated, the method includes several steps. The steps illustrated are for illustration purposes and other steps can be implemented. Additionally, while a particular order is illustrated in FIG. 2A, the present technology can be implemented in other arrangements such that the order of the steps can be different than that as illustrated. Furthermore, the present technology can include steps that are not illustrated and other embodiments can be such that one or more of the steps are removed. The method is described in relation to two servers, which can be any device as described above. For example, the servers as described below can be network attached storage devices.

The method comprises determining at a second server that a first server currently communicatively coupled to client storage device, such as an HTTP server, has experienced a communication failure (block 602). This determination can be made when the second server does not receive communication from the first server as the first server and the second server can be communicatively coupled to one another over a first set of ports (one on each server). In some examples, the determination can be made by a heartbeat sent to the second server (e.g., monitoring script, etc.). For example, a heartbeat can be sent at predetermined intervals.

The method can further comprise enabling a second port on the second server (block 604). The enabling the second port can be in response to the determination that the first server experienced a communication failure.

The method can further comprise creating a new route table by the second server (block 606). The new route (or routing) table can include information to route data that was previously routed to the first server to the second server. The route table can contain other information that is necessary to route data to the right location.

The method can further comprise flushing previous route (routing) tables (block 608). Additionally, the method can insert the new route tables in place of the flushed route tables.

The method can further include transmitting, via the second port, a request to the VPC controller to update EIP (block 610).

The method can further include receiving data via the second port from the VPC controller at the second server where the data communication would have been previously directed to the first server (block 612).

Figure 2B:
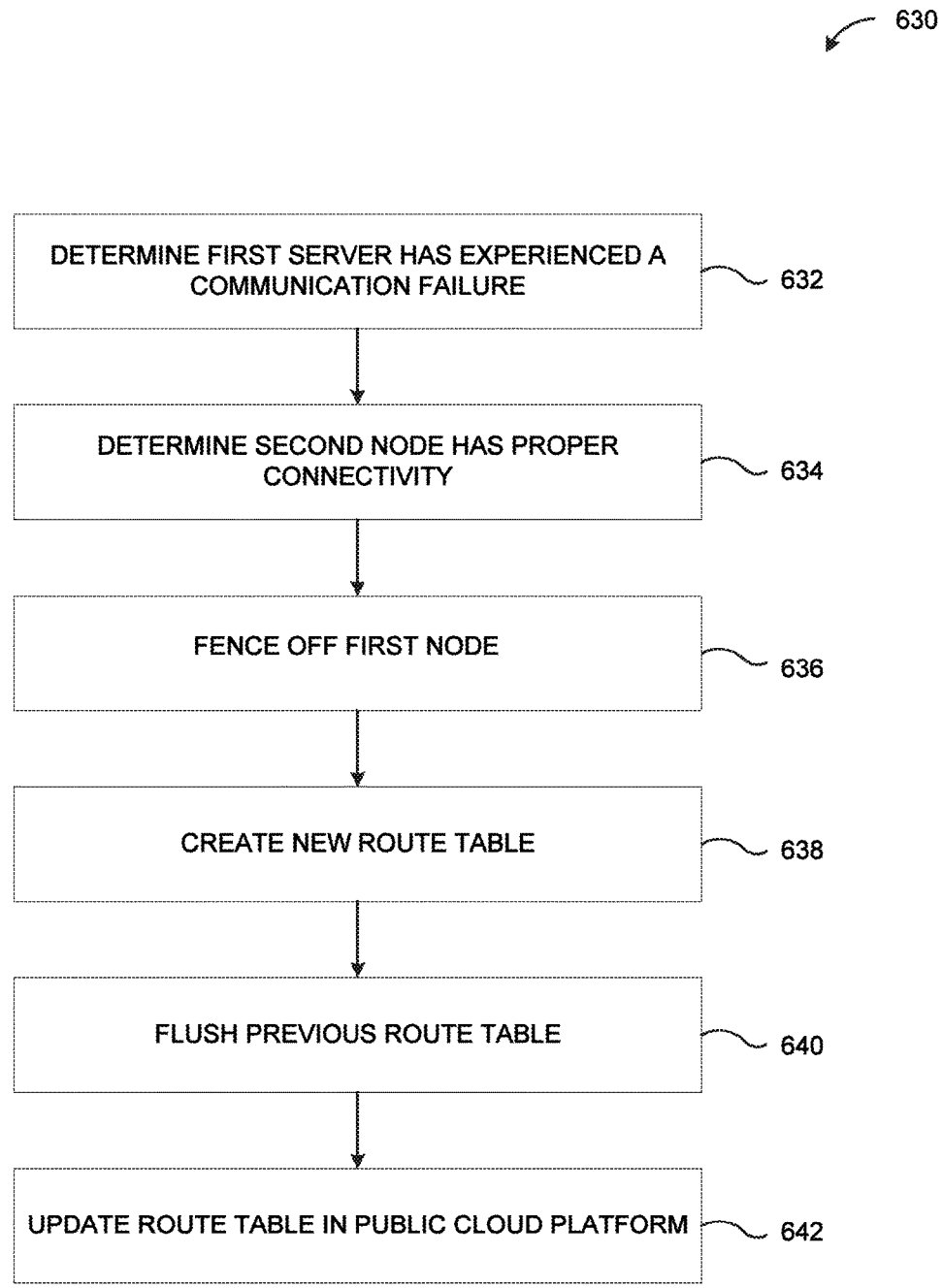

The present disclosure also includes a method 630 as illustrated with respect to FIG. 2B. As illustrated, the method includes several steps. The steps illustrated are for illustration purposes and other steps can be implemented. Additionally, while a particular order is illustrated in FIG. 2B, the present technology can be implemented in other arrangements such that the order of the steps can be different than that as illustrated. Furthermore, the present technology can include steps that are not illustrated and other embodiments can be such that one or more of the steps are removed. The method is described in relation to two servers, which can be any device as described above. In some embodiments, the method can include more than two servers. For example, the servers as described below can be network attached storage devices.

The method includes determining a first server has experienced a communication failure (block 632). For example, a second server can make the determination the first server is experiencing a communication failure (e.g., by not receiving an interval communication from the first server). In some examples, the communication failure can be determined by a heartbeat. In some examples, the interval communication (e.g., heartbeat) can be sent at predetermined intervals.

The method can further include determining the second server has proper connectivity (block 634). For example, the second server can determine whether or not it can connect to itself (e.g., via the compute network, loopback, etc.). In some examples, the second server can transmit one or more packets via a network adapter to itself to validate connectivity outside the second server. The method can further determine that the ZFS file system is responsive to the second server.

The method can further include fencing off the first server (block 636). For example, the second server can send a shutdown command (e.g., init 0) to the first server. In another example, the second server can power down a virtual machine operating the first server. In another example, the second server can power down a physical machine operating the first server.

The method can further comprise creating a new route table (block 638). For example, the second server can create a new route table (e.g., locally). The new route (or routing) table can include information to route data that was previously routed to the first server to the second server. The route table can contain other information that is necessary to route data to the correct location.

The method can further include flushing previous route tables (block 640). For example, the route table can be flushed from the target server. Additionally, the method can insert the new route tables (e.g., on the target server) in place of the flushed route tables. In some examples, when the source server is fenced off in block 636, the route table can be flushed.

The method can further include updating route table in the cloud platform (block 642). For example, the second server can transmit a command to a controller in the cloud platform (e.g., public, private, etc.) to update the virtual IP address to direct traffic (e.g., external, public, Internet, etc.) from the first server to the second server.

Figure 2C:
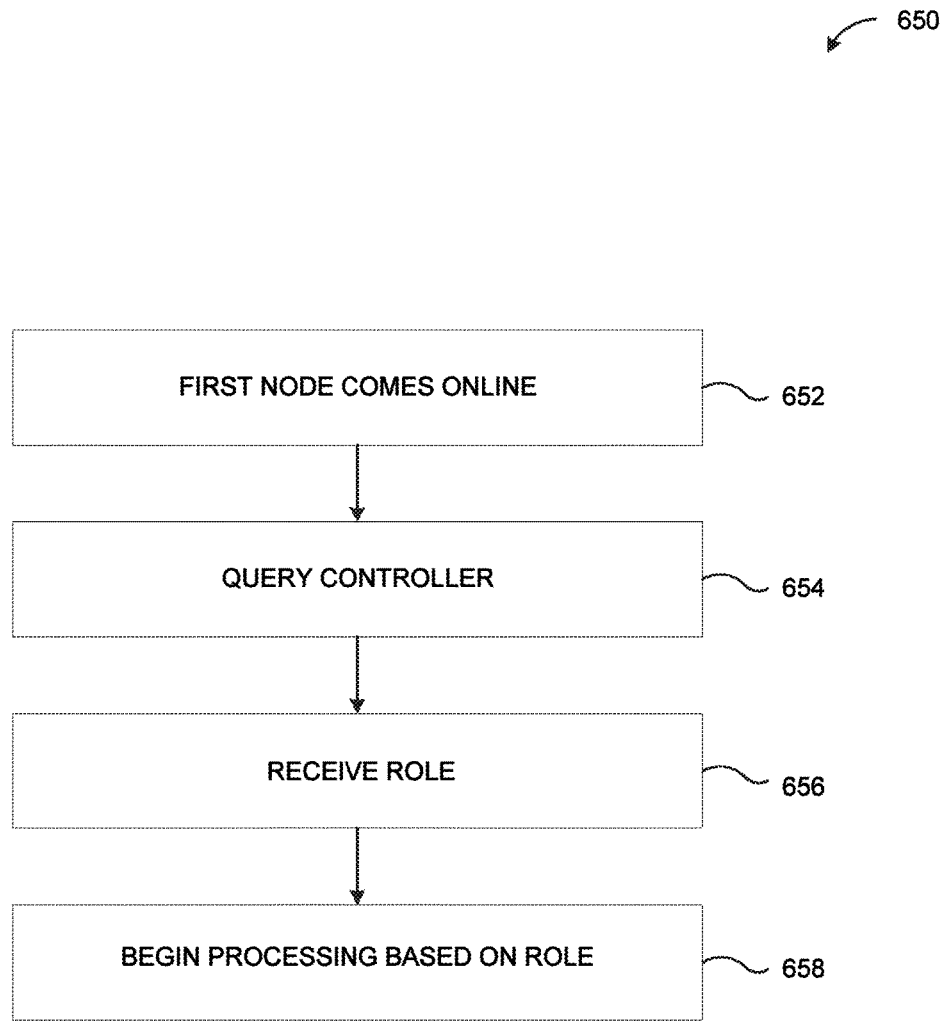

The present disclosure also includes a method 650 as illustrated with respect to FIG. 2C. As illustrated, the method includes several steps. The steps illustrated are for illustration purposes and other steps can be implemented. Additionally, while a particular order is illustrated in FIG. 2C, the present technology can be implemented in other arrangements such that the order of the steps can be different than that as illustrated. Furthermore, the present technology can include steps that are not illustrated and other embodiments can be such that one or more of the steps are removed. The method is described in relation to two servers, which can be any device as described above. In some embodiments, the method can include more than two servers. For example, the servers as described below can be network attached storage devices.

The method can include a first server coming online (block 652). For example, the first server could have come back online from an offline or communication interrupted state. The first node can come online by initiating a boot sequence (e.g., automatically or manually). In some examples, the first server could have experienced a failure that would causes input/output from the first server to fail (e.g., communication failure). During this offline state (e.g., communication failure, etc.), another server could have taken over the role of the first service (e.g., source, etc.).

The method can further include querying an HA controller (block 654). For example, the first server, upon coming online, can query an HA controller (e.g., as shown in FIG. 1) to determine the current role of the first server. In some examples, the HA controller can be the second server. In some examples, the HA controller can be a third party witness. In other examples, the HA controller can be a third server (e.g., 160). In some examples, the HA controller can be an object storage controller (e.g., bucket on the cloud, Azure blob, etc.) storing a flat file with server roles and timestamps. In some examples, the HA controller can be a low processor virtual server. The flat file can be updated during state changes of the two or more servers (e.g., with server identifying information and timestamp). In some examples, the HA controller (and flat file) can be queried, but perform no other actions besides identifying the source and target servers.

The method can further include determining the current role (block 656). For example, the first server, upon querying the HA controller can determine whether the first server is a source or target. The determination can be made at least in part, by the role defined from the query, the timestamp from the query and the last role known at the server.

The method can further include beginning processing based on the role (block 658). For example, when the first server is a target node the target node can send a message to the source server (e.g., heartbeat), along with receiving backup data from the source. In some examples, the target server can run a reconciliation process to verify the data written to the source server is stored on the target server. In some examples, the first server can come online as the source server. For example, when the first server and second server go offline at the same time and the first server is the source, when the first server is the source server and goes offline and the second server has not yet taken over, etc.

Figure 3:
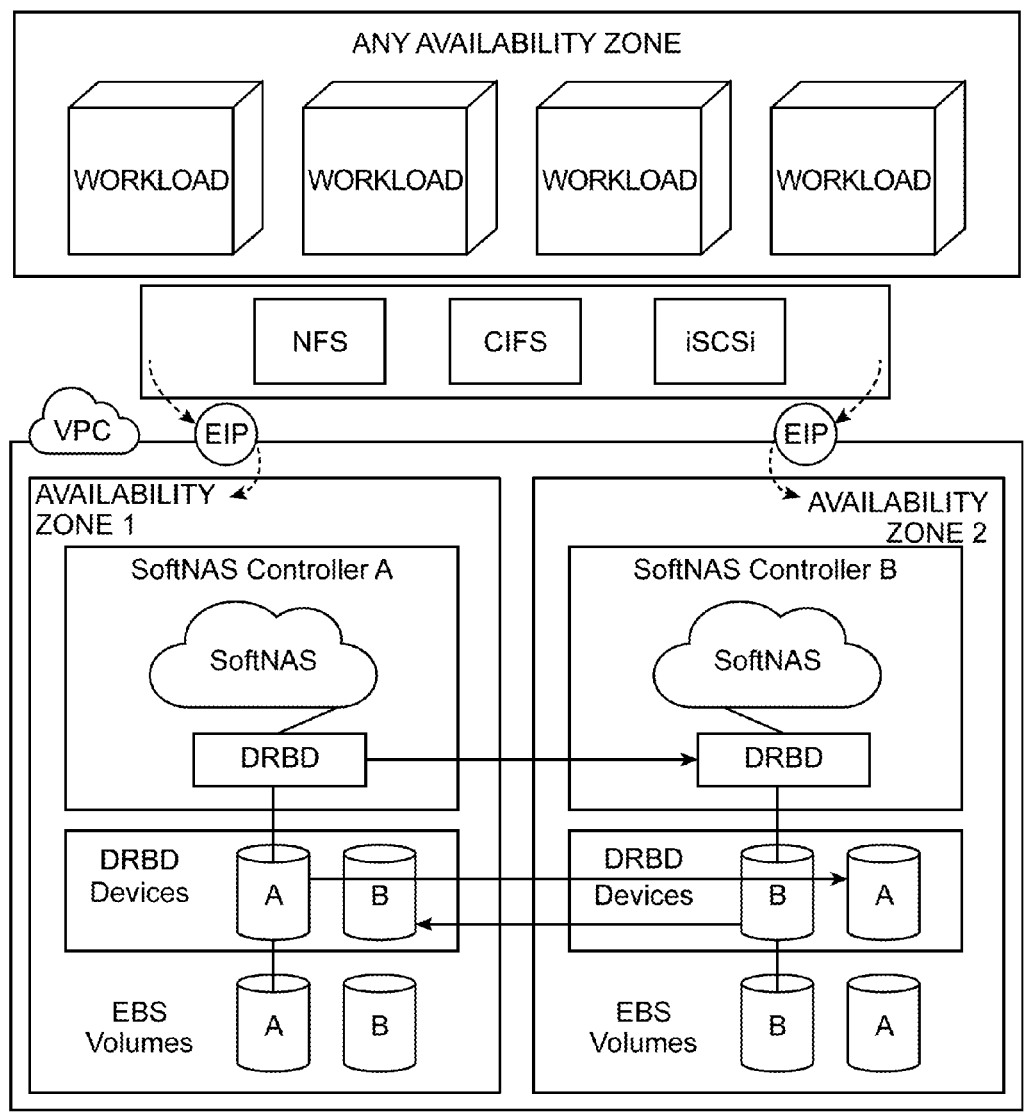
FIG. 3 is an example of a particular implementation according to the present technology prior to failover.

FIG. 3 illustrates an example of the present technology operating within a specific configuration. Additionally, the workload can come from outside of the availability zone and be directed towards any availability zone. The examples of file structures illustrated can be NFS, CIFS, iSCSi or the like as described above. As shown the data can be directed towards both the first availability zone and second availability zone. The data can be stored at drive set A within the first availability zone or on drive set B within the second availability zone 2. The data from the drive set A is communicated to the second availability zone via DRBD. The data from the drive set B is transferred from the second availability zone to the first availability zone by DRBD. This allows the data within the first availability zone to match the data within the second availability zone. As the client computer accessing the data does not know which location the data is being stored, the data is stored within the VPC. The location of the data is controlled by the EIP.

Figure 4:
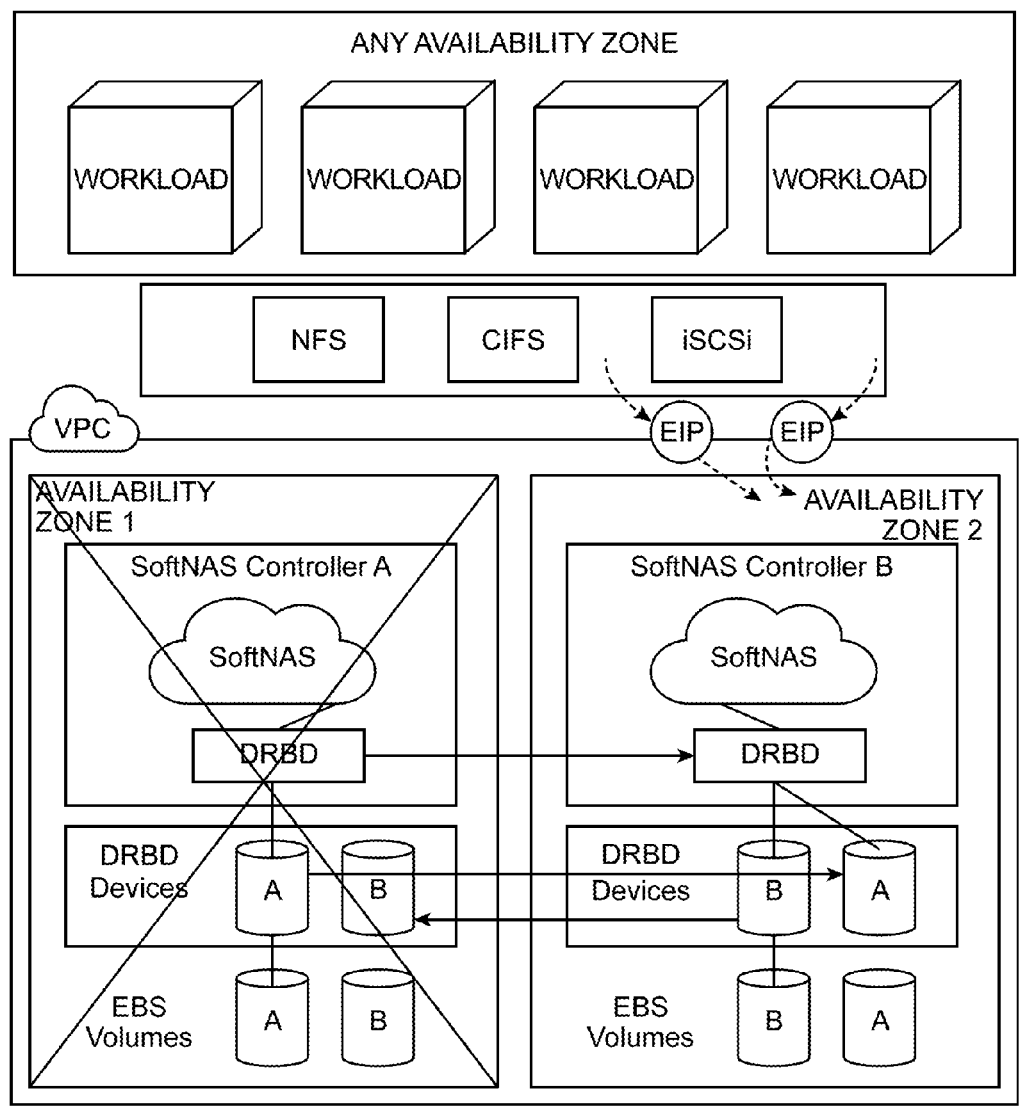
FIG. 4 is an example of a particular implementation according to the present technology after failover.

FIG. 4 illustrates the situation in which the controller within the first availability zone has lost communication with the controller within availability zone 2 and the client. In this case, the EIPs are both routed to controller B within the second availability zone. This can be handled according to the above described procedures.

Figure 5:
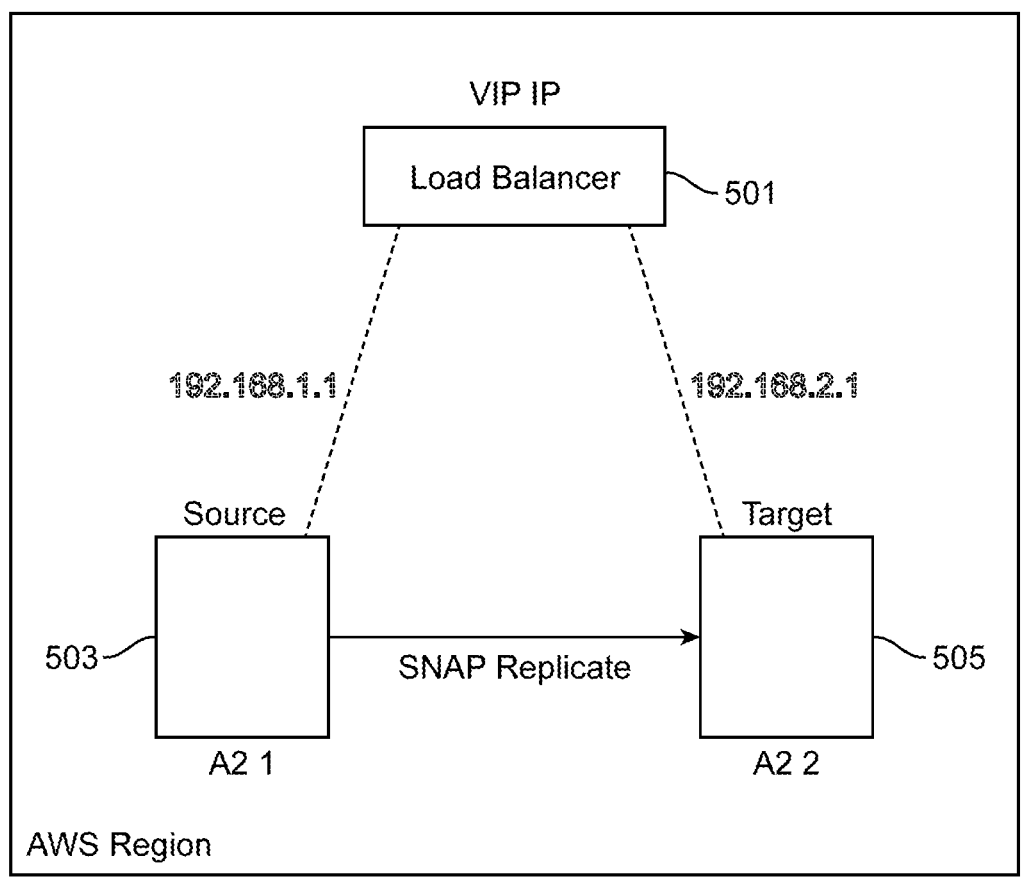
FIG. 5 is an example of a particular implementation according to the present technology.

FIG. 5 illustrates an implementation of a load balancer 501 to replicate relevant information from a first (source) node 503 to a second (target) node 505. Use of a load balancer 501 removes the need for elastic IP addresses and enables operation in private subnet within a Virtual Private Cloud using only private non-routable IP addresses. A load balancer 501 can be used to control traffic being redirected to the source node 503 when the source node 503 is in a healthy state. When a failure is detected the load balancer 501 will redirect traffic to the target node 505 which can then become a new source node in the event of a (subsequent) failure.

Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the scope of the disclosure.

Listing of Code

At least one embodiment works by first defining a specific IAM role to associate to each ec2 Instance. In at least one embodiment, each Instance must be started with 2 ethernet interfaces configured or defined or both.

IAM Role

```
{ "Statement": { "Action": [ "ec2 :AssignPrivateipAddresses",
"ec2:Describeinstances", "ec2:AssociateAddress",
"ec2:DescribeAddresses", "ec2:AllocateAddress", "ec2:EIPAssociation",
"ec2:DisassociateAddress" ], "Effect": "Allow", "Resource":"*" }
] }
```

In at least one embodiment, the monitoring scripts monitor the elastic IP addresses.

Monitoring Script

```
Instance_ID='/usr/bin/curl --silent http:/1169.254.169.254/latest/meta-data/instance-id'
ENI_ID='/opt/aws/bin/ec2-describe-instances $1nstance_ID --region $REGION 1 grep eni-m 1 | awk '{print $2;}"
echo 'date' "--Starting HA monitor"
while [ . ]; do
pingresult='ping -c 3 -W 1 $HA_Node_IP 1 grep time= 1 wc -I'
if [ "$pingresult" == "0" ]; then
echo 'date' "-- HA heartbeat failed, taking over VIP"
/opt/aws/bin/ec2-associate-address -a $A1D -n eni-a24a0dc3 --region $REGION -allow reassociation
pingresult='ping -c 1 -W 1 $VIP I grep time= 1 we -I'
if [ "$pingresult" == "0" ]; then
echo 'date'"-- Restarting network"
/sbin/service network restart > /dev/null 2>& 1
fi
sleep 60
fi
sleep 2
done
Elastic IP script for failback
root@SoftNAS-1 -]#cat failback.sh
crm resource migrate zfs_services2 SoftNAS-2
/opt/aws/bin/ec2-associate-address -a eipalloc-03a 7 e962 -n eni-46561127 --region us -east-1 --allow-reassociation
```

In at least one embodiment, each instance must have two ethernet interfaces defined.

What is claimed is:

1. A method of switching between a first node communicatively coupled to a virtual cloud controller and a second node coupled to the first node, each located within a virtual cloud, the nodes each comprising pools and volumes, the method comprising:
   determining, at the second node, that the first node has experienced a failure to send or receive data;
   determining the second node has proper connectivity;
   fencing off the first node;
   creating a new local route table by the second node;
   flushing the previous local route table;
   transmitting a request to a virtual cloud controller to update a virtual internet protocol address to point to the second node; and
   receiving, at the second node, data via the updated virtual internet protocol address.

2. The method according to claim 1, further comprising:
   initiating, at the first node, a boot sequence;
   querying a third party witness for a current role of the first node;
   determine the current role of the first node; and
   begin processing at the first node based on the current role.

3. The method according to claim 2, wherein the third party witness is a flat file including one or more source and target nodes, associated roles of the one or more source and target nodes and timestamps.

4. The method according to claim 2, wherein the third party witness is a timestamp representing a last takeover time of the first node.

5. The method according to claim 2, wherein a timestamp of the third party witness is compared at the second node to verify status as the primary node by determining the timestamp of the third party witness matches a locally stored timestamp on the second node.

6. The method according to claim 2, wherein a value of the third party witness is stored within a shared object or file t accessible by the first node and the second node.

7. The method according to claim 1, wherein the third party witness is a low processor virtual server configured to store, transmit and receive the roles associated with the one or more source and target nodes and timestamps.

8. The method according to claim 1, further comprising automatically discovering network information present on both nodes necessary to achieve communication between both nodes, including:
   automatically discovering a plurality of candidate nodes in the virtual cloud;
   receiving an indication of a first node and a second node from the plurality of candidate nodes; and
   configuring one or more route tables and virtual internet protocol address to configure the first node as a source and the second node as a target.

9. The method according to claim 1, further comprising:
   configuring a third node to communicatively couple to the second node, wherein the third node replaces the first node; and
   updating the third node with the pools and volumes.

10. The method according to claim 1, further comprising automatically discovering information present on both nodes necessary to achieve replication, including at least determining which storage pools and volumes need to be replicated, the determination including:
    automatically discovering storage pools on the nodes that have a same name;
    automatically discovering the volumes in each such storage pool;
    automatically configuring tasks necessary for each volume to be replicated;
    automatically determining whether a full back-up or synchronization from the first node to the second node of all storage pools and volumes in the source node is necessary; and
    upon such determination, executing the full back-up or synchronization from the first node to the second node of all storage pools and volumes in the source node.

11. The method according to claim 1, wherein the determining that the first node has experienced the failure to send or receive data is performed at a high availability controller independent of the second node.

12. The method according to claim 1, wherein fencing off the first node further comprising:
    sending, from the second node to the first node, a shut down command.

13. The method according to claim 1, wherein fencing off the first node further comprising:
    powering off a virtual machine on which the first node is operating.

14. A controller for switching between a first node communicatively coupled to a virtual cloud controller and a second node coupled to the first node, each located within a virtual cloud, the first and the second node each comprising pools and volumes, the controller comprising:
    a processor; and
    a memory storing instructions, which when executed by the processor, causes the processor to:
        determine that the first node has experienced a failure to send or receive data;
        determine the second node has proper connectivity;
        fence off the first node;
        create a new local route table;
        flush the previous local route table;
        transmit a request to a virtual cloud controller to update a virtual internet protocol address to point to the second node; and
        receive at the second node data via the updated virtual internet protocol address.

15. The controller according to claim 14, further comprising instructions, which when executed by the processor, causes the processor to:
    initiate, at the first node, a boot sequence;
    query a third party witness for a current role of the first node;
    determine the current role of the first node; and
    begin processing at the first node based on the current role.

16. The controller according to claim 15, wherein the third party witness is a flat file including one or more source and target nodes, associated roles of the one or more source and target nodes and timestamps.

17. The controller according to claim 15, wherein the third party witness is a timestamp representing a last takeover time of the first node.

18. The controller according to claim 15, wherein a timestamp of the third party witness is compared at the second node to verify status as the primary node by determining the timestamp of the third party witness matches a locally stored timestamp on the second node.

19. The controller according to claim 15, wherein a value of the third party witness is stored within a shared object or file t accessible by the first node and the second node.

20. The controller according to claim 14, wherein the third party witness is a low processor virtual server configured to store, transmit and receive the roles associated with the one or more source and target nodes and timestamps.

* * * * *